US012095198B2

(12) United States Patent
Barbey

(10) Patent No.: US 12,095,198 B2
(45) Date of Patent: Sep. 17, 2024

(54) CIRCULAR MODULAR PLUGGABLE CONNECTOR

(71) Applicant: LEMO SA, Ecublens (CH)

(72) Inventor: Jean-Philippe Barbey, Promasens (CH)

(73) Assignee: LEMO SA, Ecublens (CH)

( * ) Notice: Subject to any disclaimer, the term of this patent is extended or adjusted under 35 U.S.C. 154(b) by 0 days.

(21) Appl. No.: 18/563,053

(22) PCT Filed: May 17, 2022

(86) PCT No.: PCT/EP2022/063357
§ 371 (c)(1),
(2) Date: Nov. 21, 2023

(87) PCT Pub. No.: WO2022/248291
PCT Pub. Date: Dec. 1, 2022

(65) Prior Publication Data
US 2024/0235100 A1 Jul. 11, 2024

(30) Foreign Application Priority Data
May 26, 2021 (EP) .................................... 21176036

(51) Int. Cl.
*H01R 13/514* (2006.01)
*H01R 13/58* (2006.01)
*H01R 13/631* (2006.01)

(52) U.S. Cl.
CPC ....... *H01R 13/514* (2013.01); *H01R 13/5816* (2013.01); *H01R 13/631* (2013.01)

(58) Field of Classification Search
CPC . H01R 13/514; H01R 13/5816; H01R 13/631
See application file for complete search history.

(56) References Cited

U.S. PATENT DOCUMENTS 6,367,984 B1 * 4/2002 Stephenson .......... G02B 6/3825 385/76
6,523,241 B1 * 2/2003 Hubert ................ G02B 6/3888 29/451
(Continued)

FOREIGN PATENT DOCUMENTS

CN 109560424 4/2020
EP 1050931 11/2000
(Continued)

OTHER PUBLICATIONS

International Search Report and Written Opinion issued by the International Searching Authority, dated Sep. 5, 2022, for International Patent Application No. PCT/EP2022/063357; 14 pages.

*Primary Examiner* — Abdullah A Riyami
*Assistant Examiner* — Nader J Alhawamdeh
(74) *Attorney, Agent, or Firm* — Faegre Drinker Biddle & Reath LLP

(57) ABSTRACT

Connector system comprising a first pluggable electrical connector comprising a substantially circular casing and a terminal unit mounted within the casing, the terminal unit comprising a housing with a module receiving cavity formed within the housing, and a plurality of terminal modules insertably received in the module receiving cavity in a stacked arrangement, each terminal module comprising a plurality of contacts, and a mating second connector pluggably connectable and disconnectable to the first connector, the mating second connector comprising a substantially circular casing and a terminal unit mounted within the casing, the terminal unit comprising a housing and a plurality of terminal modules mounted in a stacked arrangement in said housing, each terminal module comprising a plurality of contacts for pluggable connection to a corresponding said plurality of contacts of said first connector.

13 Claims, 7 Drawing Sheets

(56) References Cited

U.S. PATENT DOCUMENTS

Figure 1B:
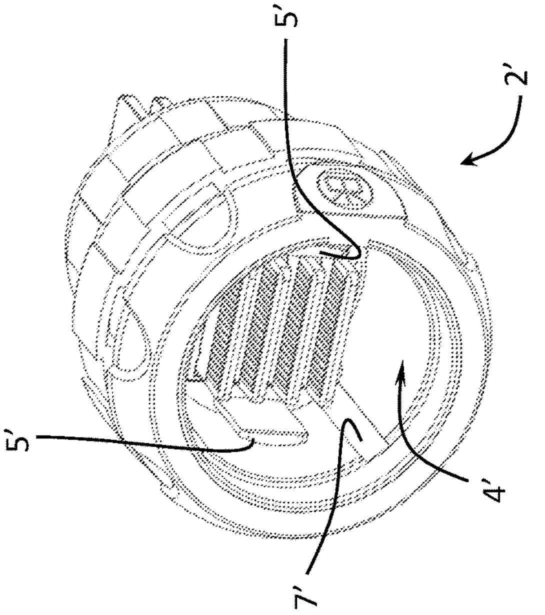

| | | | | | |
|---|---|---|---|---|---|
| 11,437,753 | B2 * | 9/2022 | Wolfe | .................. | H01R 12/732 |
| 2021/0226376 | A1 * | 7/2021 | Wolfe | ................ | H01R 13/6587 |

FOREIGN PATENT DOCUMENTS

| | | | | | |
|---|---|---|---|---|---|
| EP | 2112722 | | 10/2009 | | |
| EP | 2658040 | | 10/2013 | | |
| EP | 2757639 | | 7/2014 | | |
| JP | 2020522858 | | 7/2020 | | |
| WO | 2015/160866 | | 10/2015 | | |
| WO | 2017/076781 | | 5/2017 | | |
| WO | 2019/219847 | | 11/2019 | | |
| WO | WO-2019219847 | A1 * | 11/2019 | ........... | H01R 12/732 |

* cited by examiner

CIRCULAR MODULAR PLUGGABLE CONNECTOR

CROSS-REFERENCE TO RELATED APPLICATIONS

The present application is a national stage entry of International (PCT) Patent Application Number PCT/EP2022/063357, filed May 17, 2022, which claims priority to European Patent Application Number 21176036.8, filed May 26, 2021, the complete disclosures of which are expressly incorporated herein by reference.

The present invention relates to a circular push-pull modular pluggable electrical connector.

A circular high density pluggable electrical connector with a push-pull latching arrangement of the casing is described in publication WO 2019/219847. In this publication, it is known to provide a modular electrical connector system having a first connector pluggably connectable to a second mating connector and latching together via a push-pull mechanism. Each of the first and second connectors have outer casings, typically made of metal or plastic, and mounted therein a terminal unit that has slots for insertably mounting a plurality of terminal modules in a stacked manner. Each terminal module has a plurality of electrical contacts. The terminal modules in particular comprise on the mating connector, circuit boards that insert into receptacle contacts of the first connector. Each terminal module is guided within the terminal unit housing, however due to manufacturing tolerances there may be slight amount of play or conversely a tight fit that sets the precise angular position of each terminal module within the terminal unit. The terminal unit is also mounted within the casing and positioned with respect to the casing and here also due to manufacturing tolerances there may be a slight variation in the angular position of the terminal unit within the casing. The casing of the first and second mating connectors provide the main alignment and rotational positioning and mechanical coupling between the first and second connectors. However, in view of the high density of contacts and the slight angle that may slightly vary between the terminal units and the casing on one hand and the terminal modules within the terminal unit on the other hand, overall when the casings of the first and second connectors are pluggably coupled together the terminals of the first connector may not engage with sufficient accuracy the terminals of the mating connector further considering that there may be differences between the different modules of the stack. This leads to very high plugging forces and potentially damage of the contacts during the plugging connection.

A further possible drawback of the module and pluggable connector described in the aforementioned publication, concerns the connection of the cable to the terminals within the first connector. Typically, the cable will be clamped within the casing, however conventional cable clamps allow slight movement of the cable, which due to the high number of contacts can lead to slight movements in the weld or solder connections between the leads of the cable and the contact pads of the terminal modules. A more secure anchoring of the cable to the casing would thus be needed.

In the view of the foregoing, an object of the invention is to provide a modules pluggable connector that can accommodate various contact arrangements including a high density contact arrangement yet allows reliable plugging and unplugging with low mating forces, especially for a push-pull casing configuration.

It is another object of the invention to provide a modular pluggable connector especially for push-pull arrangements that has a robust and secure cable anchoring.

It is advantageous to provide a modular pluggable connector that has a high versatility It is advantageous to provide a high density pluggable electrical connector that is easy to interconnect to conducting leads, and that is easy to test and repair if needed.

It is advantageous to provide a high density pluggable electrical connector that can be easily modified for different uses or requirements.

It is advantageous to provide a high density pluggable electrical connector that is cost effective to manufacture and assemble.

It is advantageous to provide an electrical connector that is versatile and allows various connection techniques and possibilities for interconnection to a cable and other conducting lead arrangements.

It is advantageous to provide a high density pluggable electrical connector that has a low plugging force with a mating connector, yet ensures reliable electrical interconnection.

Objects of this invention have been achieved by providing a modular pluggable connector according to claim 1.

Disclosed herein is a connector system comprising a first pluggable electrical connector comprising a substantially circular casing and a terminal unit mounted within the casing, the terminal unit comprising a housing with a module receiving cavity formed within the housing, and a plurality of terminal modules insertably received in the module receiving cavity in a stacked arrangement. Each terminal module comprises a plurality of contacts, and a mating second connector pluggably connectable and disconnectable to the first connector. The mating second connector comprises a substantially circular casing and a terminal unit mounted within the casing, the terminal unit comprising a housing and a plurality of terminal modules mounted in a stacked arrangement in said housing. Each terminal module comprises a plurality of contacts for pluggable connection to a corresponding said plurality of contacts of said first connector.

The casings comprising angular alignment members configured to angularly align the casings of the respective first and second connectors with respect to each other.

The terminal unit housing of the first connector comprises angular positioning members mating with complementary angular positioning members on the terminal unit housing of the second connector, the angular positioning members and mating angular positioning members are configured to allow sliding insertion during plugging connection and to align the terminal units of the mating first and second connectors as they are plugged together.

The terminal unit of at least one of the first and second connectors is provided with a slight angular play with respect to the casing allowing an angular rotation in a range between 0.5° and 3° of the terminal unit with respect to the casing.

In an advantageous embodiment, the angular positioning members comprise receptacles and the complementary angular positioning members comprise tabs insertable in the receptacles.

In an advantageous embodiment, each of the first and second connectors comprise a pair of angular positioning members, each of the pair arranged on opposite sides of the terminal module housing.

In an advantageous embodiment, the angular positioning members are integrally formed with the terminal unit housing.

In an advantageous embodiment, the angular play between the terminal unit and the casing is in a range of 0.5° and 2°.

In an advantageous embodiment, the terminal unit of only one of the first and second connectors is provided with said slight angular play with respect to the casing and the terminal unit of the other of the first and second connectors is fixed to the casing without angular play.

In an advantageous embodiment, each of the terminal modules within the terminal housing of at least one of the first and second connectors are provided with a slight amount of play in a range of 0.05 mm to 0.2 mm to allow each of the mating terminal modules to self align with each other to reduce mating forces.

In an advantageous embodiment, the play between each terminal module and the terminal housing is in a range of 0.08 mm to 0.15 mm In an advantageous embodiment, at least one terminal module within the terminal housing has a height H and at least a second terminal module has an integer multiple of said height H.

In an advantageous embodiment, the casing of at least the first connector comprises a cable grip sleeve and a cable grip tightening nut engaging an outer threaded portion of the cable grip sleeve configured to cause an axial displacement of the cable grip sleeve, the cable grip sleeve comprising a plurality of integrally formed gripping arms with serrations at ends thereof, the gripping arms separated by slots to allow each gripping arm to be able to bend elastically independently of from the other.

In an advantageous embodiment, there are four six gripping arms and corresponding slots.

In an advantageous embodiment, the casing comprises a pair of inner shells mounted around a rear end of the terminal housing and the cable grip tightening nut abuts against an end of the inner shells.

In an advantageous embodiment, an outer peripheral surface of each gripping arm is provided a cam head portion that engages a conical cable grip camming surface on an inner surface of the inner shells.

Figure 1A:
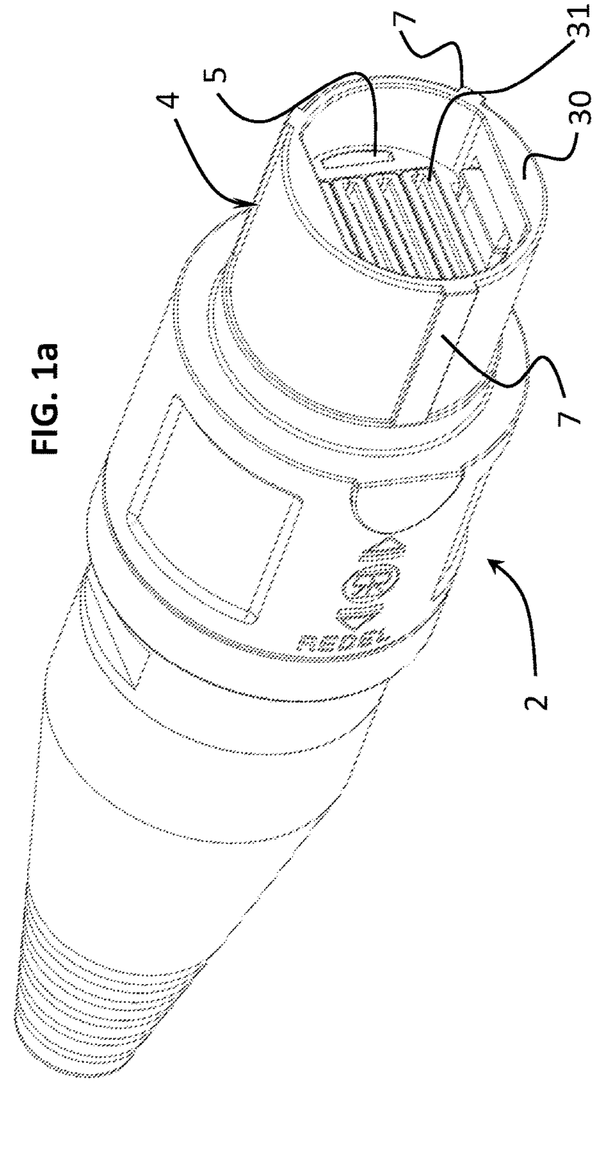
Figure 1C:
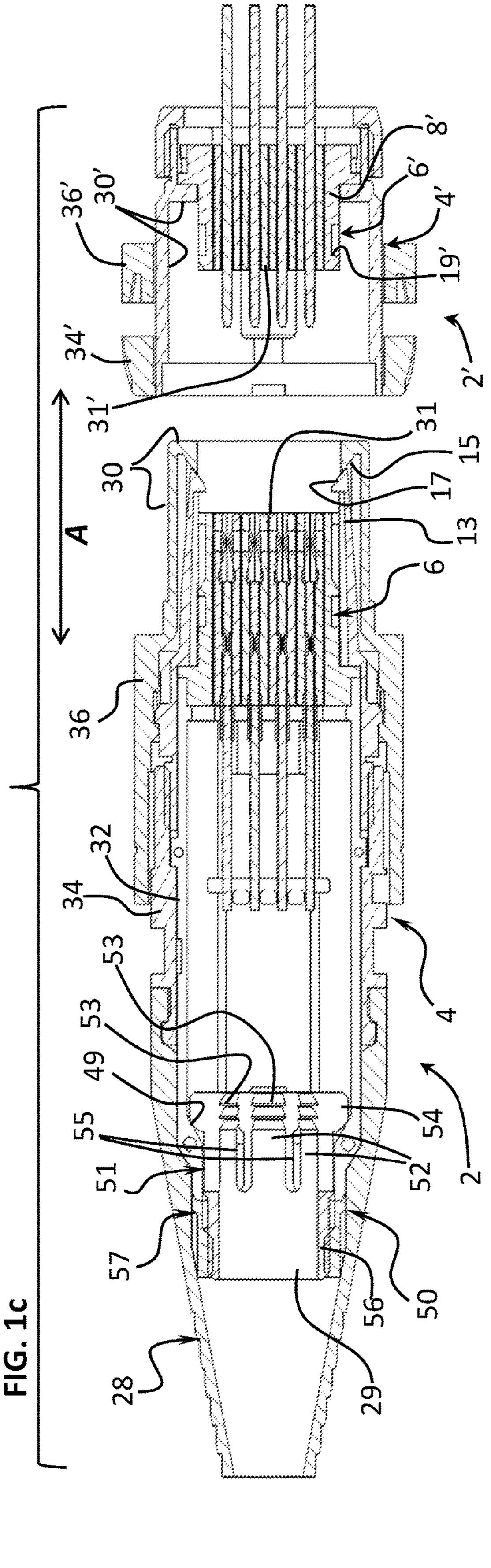

Further objects and advantageous features of the invention will be apparent from the claims, from the detailed description, and annexed drawings, in which:

FIGS. 1*a* and 1*b* are perspective views of a pluggable electrical connector system according an embodiment of the invention, illustrating a first connector (FIG. 1*a*) pluggable to a mating second connector (FIG. 1*b*);

FIG. 1*c* is a cross sectional view of the mating pluggable connectors of FIGS. 1*a* and 1*b;*

Figure 1D:
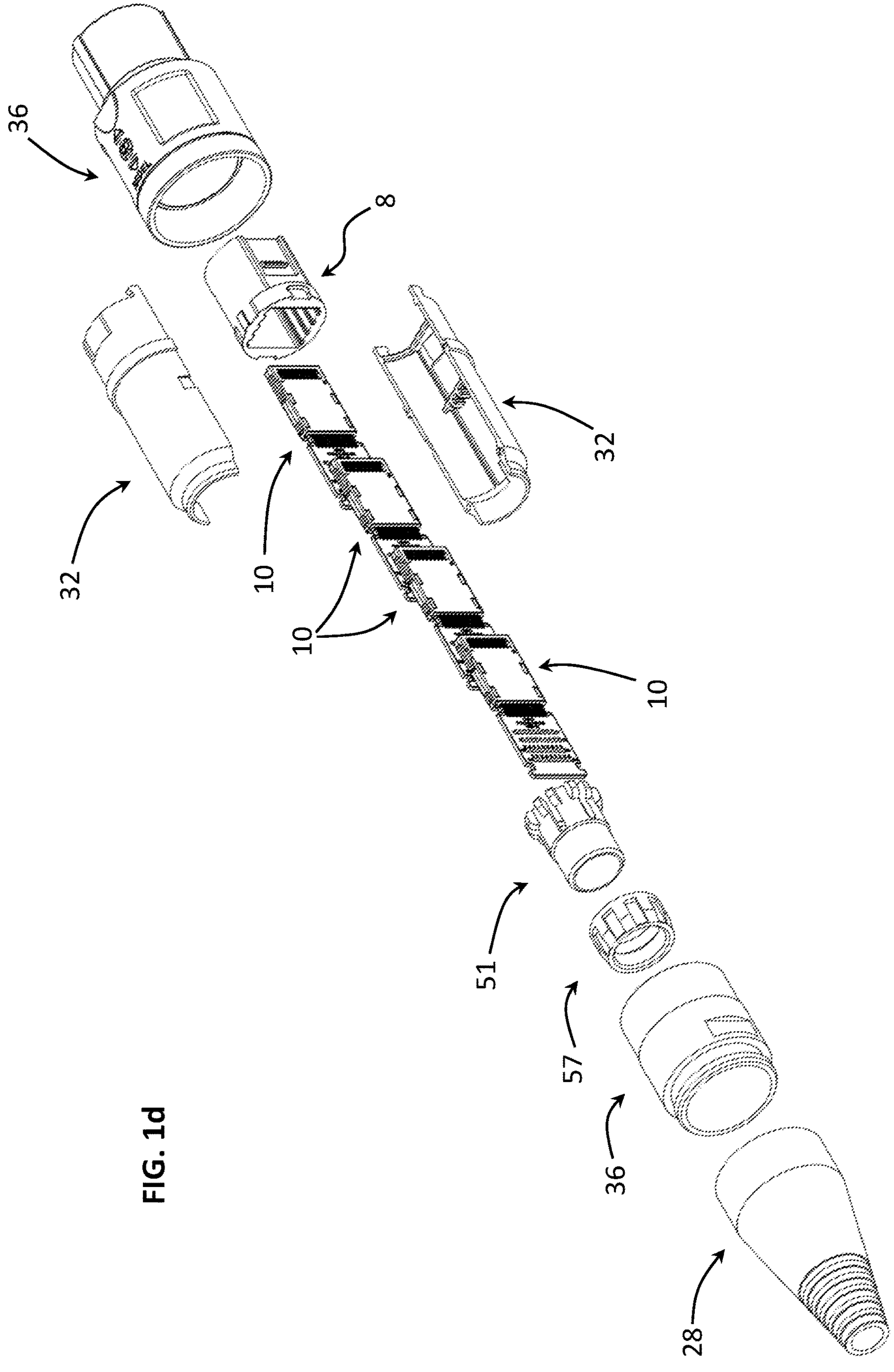
Figure 2B:
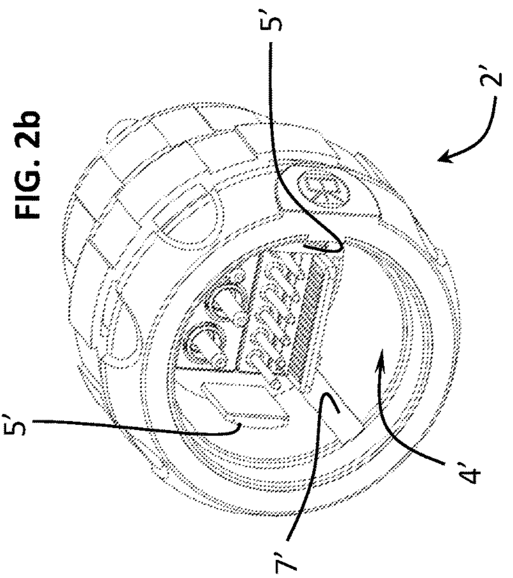
Figure 2A:
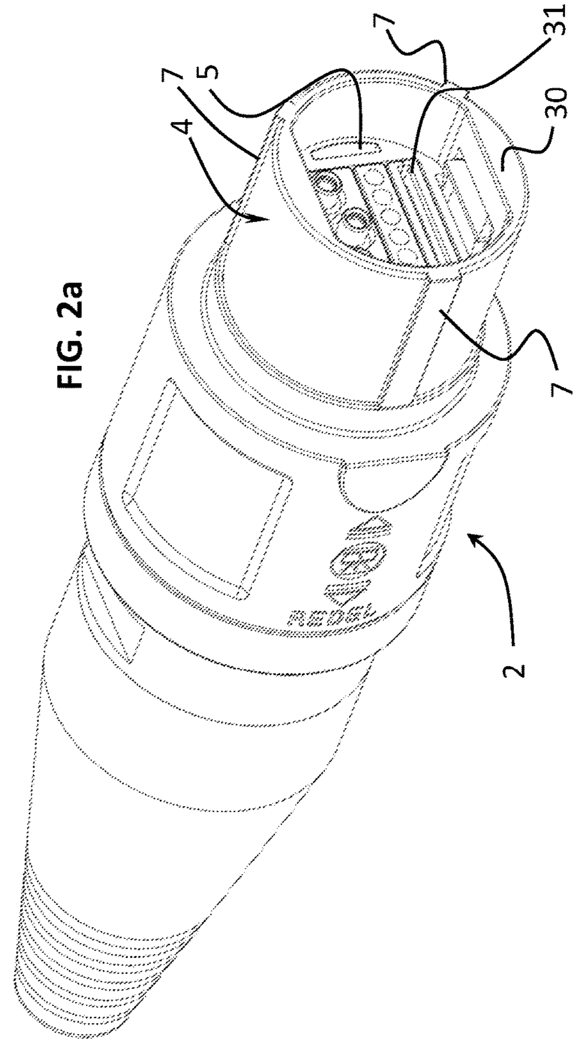
Figure 2C:
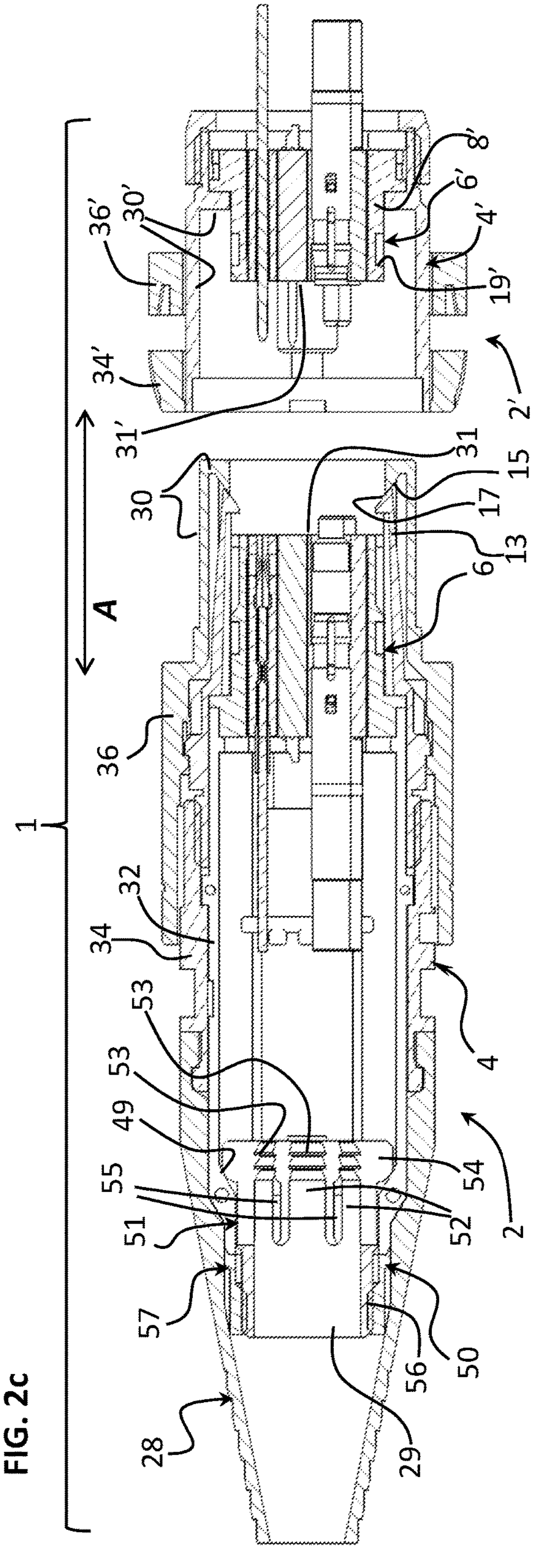
Figure 2D:
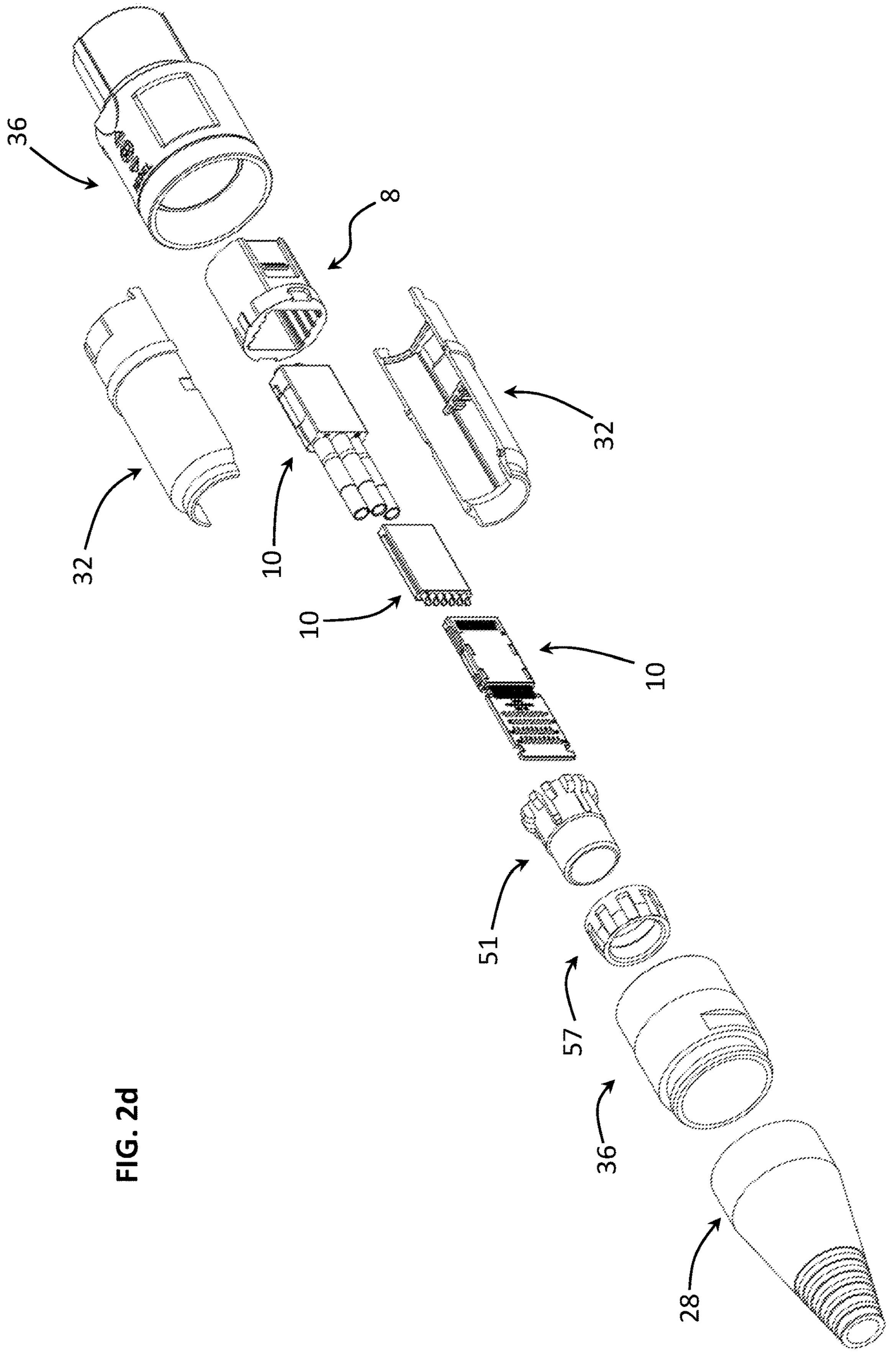

FIG. 1*d* is a perspective exploded view of the first connector of FIG. 1*a;*

Figure 3B:
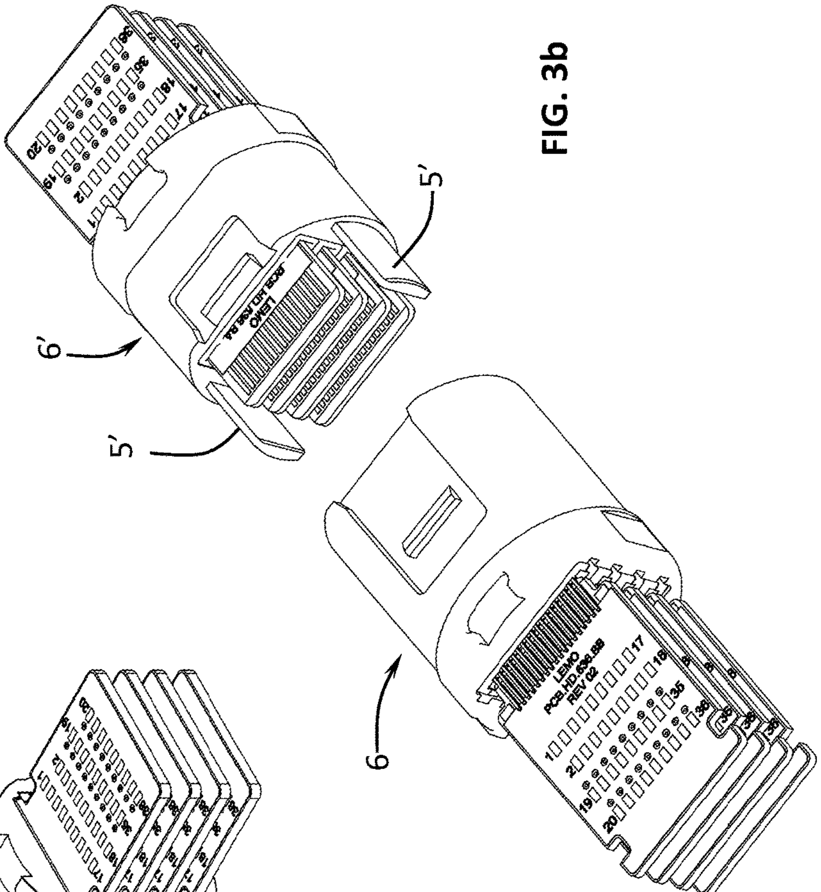
Figure 3A:
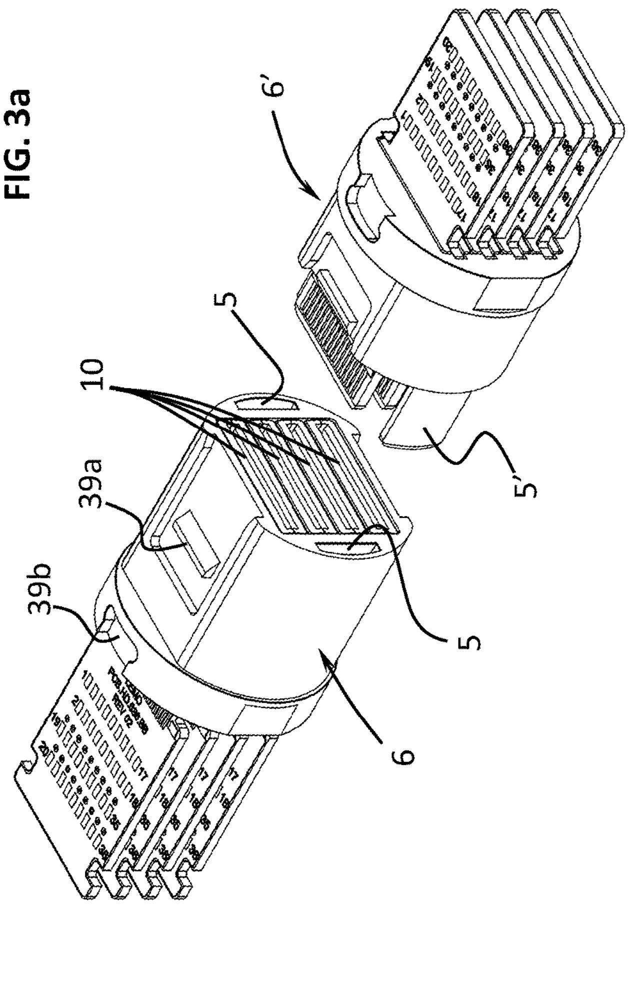
Figure 3C:
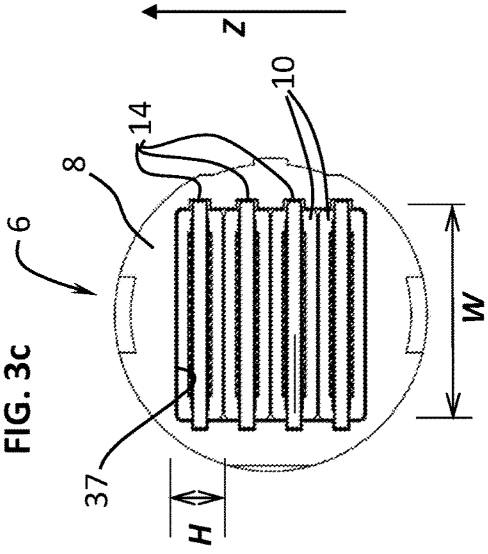

FIGS. 2*a* to 2*d* are views similar to FIGS. 1*a* to 1*d* respectively of a variant;

FIGS. 3*a* and 3 *b* are perspective views of terminal units of the first and second mating connectors according to an embodiment of the invention, showing a variant of terminal modules;

FIG. 3*c* is a plan view of the rear side of the terminal unit of the second mating connector of FIG. 3*a;*

Figure 4B:
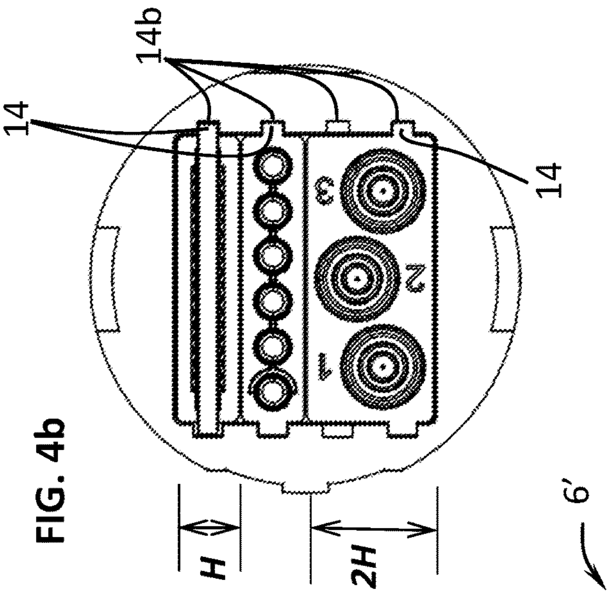
Figure 4A:
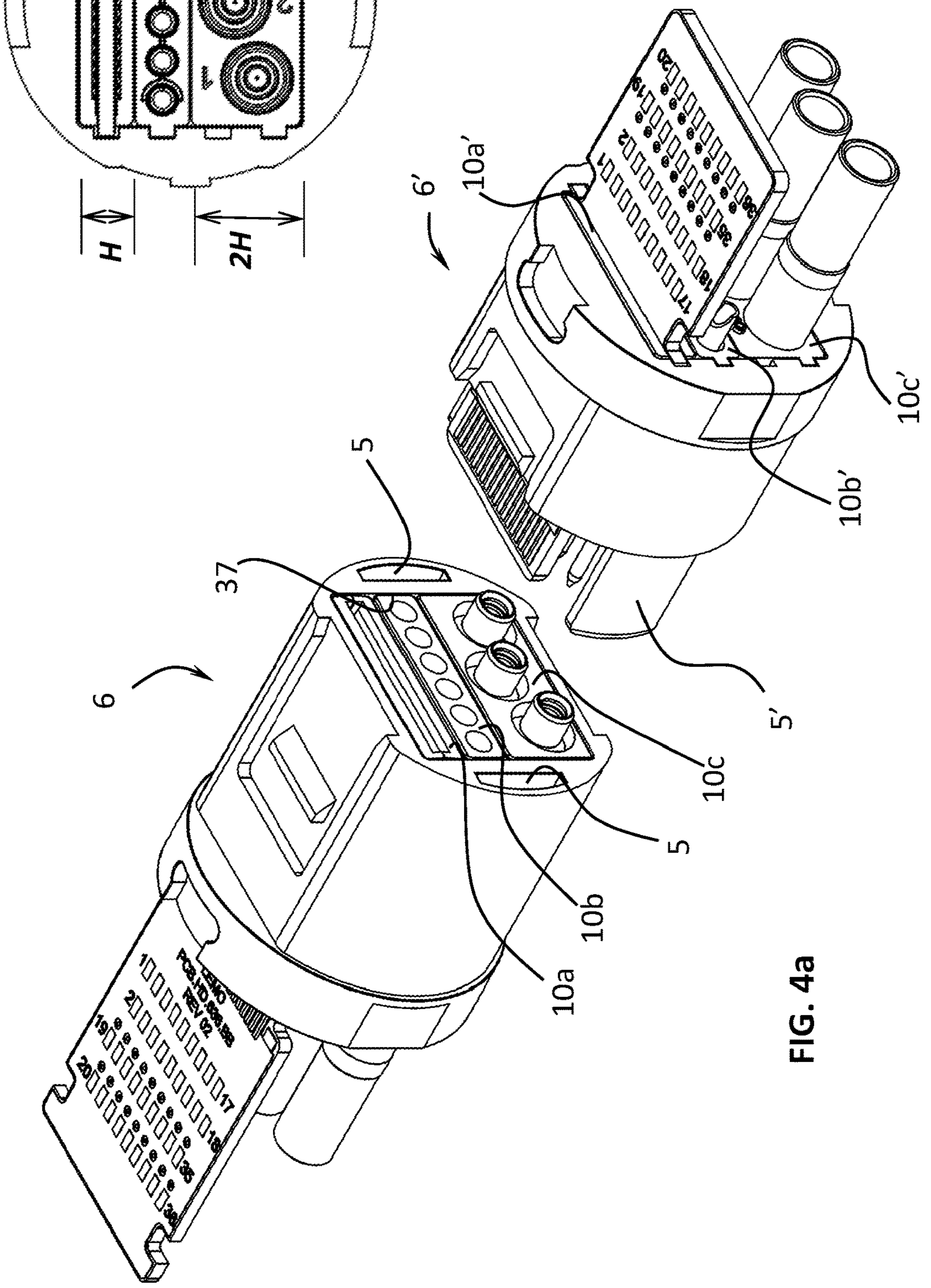
Figures 5A, 5B:
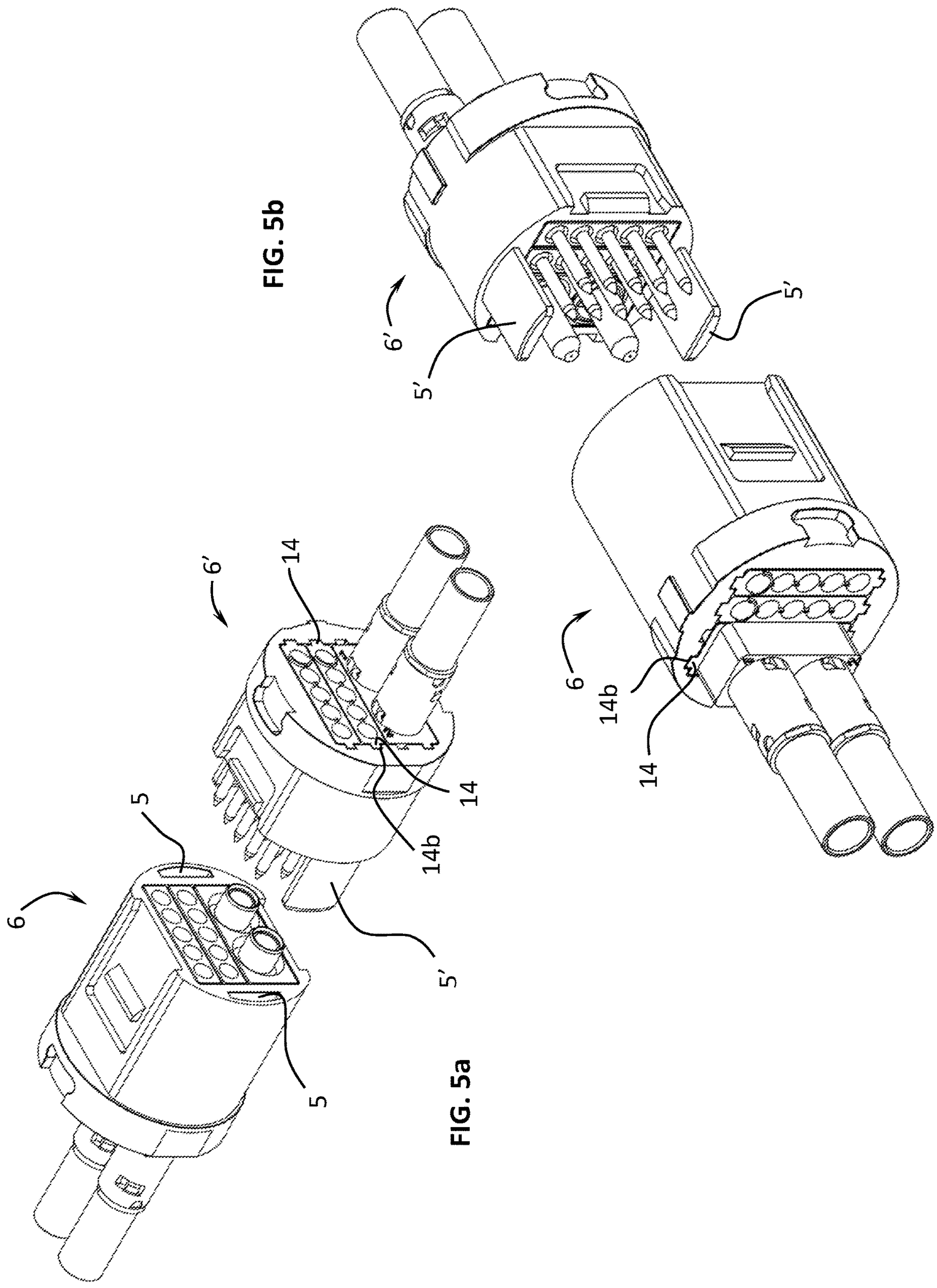

FIGS. 4*a* and 4*b* are perspective views of terminal units of the first and second mating connectors according to an embodiment of the invention, showing another variant of terminal modules;

FIGS. 5*a* and 5*b* are perspective views of terminal units of the first and second mating connectors according to an embodiment of the invention, showing yet another variant of terminal modules.

Referring to the figures, a high density pluggable electrical connector system 1 according an embodiment of the invention comprises a high density pluggable electrical connector 2 and a mating electrical connector 2', the connectors 2, 2' being pluggably connectable and disconnectable in an axial direction A.

In the illustrated embodiment, the high density pluggable electrical connector 2 is configured for termination to a multi conductor cable (not shown), and the mating connector 2' is configured for mounting on a panel or device (not shown). In the illustrated example, the mating connector 2' comprises locking rings 34', 36', at least one of which threadably engages an outer thread on the casing 4' to tighten/lock the connector 2' to the panel or device.

However, within the scope of the invention, the mating connector may also be a cable connector, instead of a panel or device mounted connector, configured for termination to a multi conductor cable (not shown) similar to the pluggable cable connector 2.

The high density pluggable electrical connector 2 according to embodiments of this invention comprises a terminal unit 6 housed within a casing 4. The terminal unit 6 comprises a dielectric housing 8 within which a plurality of terminal modules 10 are inserted and fixed. The casing 4 and terminal unit 6 present a plugging interface 31, 30 for coupling to a complementary plugging interface 31', 30' of a mating connector 2'.

The mating connector 2' according to embodiments of this invention may also comprise a terminal unit 6' housed within a casing 4'. The terminal unit 6' comprises a dielectric housing 8' within which a plurality of terminal modules 10' are inserted and fixed. The casing 4' and terminal unit 6' present a plugging interface 31', 30' for coupling to the plugging interface 31, 30 of the high density pluggable electrical connector 2.

In the illustrated embodiment of the pluggable high density cable connector 2, the casing 4 of the connector 2 extends axially from a cable exit end 29 to a plugging interface 30 and comprises an inner shell 32 that mounts around the rear end of the terminal unit 6, and outer shells 36, 34 mounted around the terminal unit 6 and inner shell 32. The outer shell comprises a mating end ring shell 36 inserted over a plugging end of the terminal unit and a cable end ring shell 34 mounted over a cable exit end of the inner shell. A cable exit sleeve 28 may further be provided, coupled to the cable end ring shell. The inner shell 32 may for instance be in the form of half shells that enable assembly around the rear end of the terminal unit 8, the inner shell and terminal unit being provided with interengaging positioning and locking means such as complementary protuberances and recesses 39*a*, 39*b*, that securely lock the terminal unit to the inner shell in a fixed angular and axial position.

The mating end ring shell 36 is axially slidable relative to the inner shell 32 and has inner camming surfaces 15 configured to engage cam surfaces 17 of elastic latch arms 13 when pulled axially away from the mating connector 2'. This provides an unlatching function in the "pull" direction to disconnect the connectors 2, 2', whereby the latch shoulders of the latch arms 13 are released from the latch shoulders 19' on the mating connector 2'.

The casing 4, 4' of the connectors 2, 2' may be made of various materials including, for instance, polymers, reinforced polymers and metals to provide a durable connector.

The metallic casing may optionally also be connected to an electrical ground connection for electrical shielding of the terminal unit 6, 6' mounted therein. In a variant, the casing may also comprise a magnetic shielding material to provide shielding against strong magnetic fields for applications in which the connector is subject to strong magnetic fields such as in MRI or other applications.

In the illustrated embodiment, the cable exit end is axially aligned with the plugging direction A, however it may be appreciated that various cable outlet directions are possible such as right angle, or at any oblique angle. Moreover, the shape of the cable may be round or have various other shapes such as generally rectangular and flat. The cable exit end may therefore have various configurations as discussed above without departing from the scope of the invention.

The casing plugging interface 30 comprises guiding and locking elements for guiding and locking the connector to the mating connector.

The inner shell 32 in the form of two inner shell parts that mount laterally around the rear end of the terminal unit 6 enables the terminal unit to be connected to leads of a cable inserted through the cable exit sleeve 28 and cable end locking ring 34 without interference from other casing parts, enabling also easy repair or modification to the terminal unit by complete removal of the casing locking rings 34, 36 and inner shell parts 32. Such casing configurations are per se known and do not need to be further described.

The housing 8 of the terminal unit comprises a module receiving cavity 37 within which a plurality of terminal modules 10 are insertably received in a stacked manner.

The housing 8' of the terminal unit of the mating connector 2' may also comprise a module receiving cavity 37' within which a plurality of terminal modules 10' are insertably received in a stacked manner.

Each terminal module 10 of the high density pluggable electrical connector 2 may advantageously be provided with insertion guide rails 14 that cooperate with complementary guide members 14*a* in the module receiving cavity 37 of the housing 8 to allow axial insertion of the terminal modules in the housing at a defined level in the stack of the plurality of terminal modules 10.

Each terminal module may advantageously have a ratio H/W between the overall height H in the stacking direction Z to the overall width W, that is less than 30 percent, preferably in the range of 20 to 30 percent. The aforementioned ratio provides for an advantageous distribution of the electrical contacts, in particular for ease of interconnection to wires of a cable while providing a high connection density.

The terminal modules 10, 10' may be arranged such that they may be individually extracted out of the terminal housing 8, 8' in order to replace or repair a terminal module, for instance in case of a defective plugging contact portion or in case of a defective interconnection to wires of a cable connected to the connector 2, 2'.

The terminal modules 10, 10' may have a configuration that is per se known from publication WO 2019/219847. According to an aspect of the invention, terminal modules of having a height H or an integer multiple thereof e.g. 2H, 3H, 4H may be inserted into the module receiving cavity 37 of the terminal unit housing 8, 8'. Different configurations of terminal modules may be inserted in the module receiving cavity, for instance:

- a stack of terminal modules 10 as illustrated in FIGS. 3*a* to 3*c* corresponding to configurations found in WO 2019/219847, or
- different terminal modules with different types of contacts 10*a*, 10*b*, 10*c*, 10*a'*, 10*b'*, 10*c'* as illustrated in FIGS. 4*a* to 4*b* or as illustrated in FIGS. 5*a* to 5*b*.

A single casing design and terminal unit housing design may thus be provided, within which various different terminal modules of height ranging from H to integer multiples of H, such as 4H, may be inserted to provide different configurations of connection interfaces in an economical manner.

According to an aspect of the invention, the terminal unit housing 8 of the first connector comprises angular positioning members 5 mating with complementary angular positioning members 5' on the terminal unit housing 8' of the second connector. In the illustrated embodiment, the angular positioning members comprise receptacles and the complementary angular positioning members comprise tabs insertable in the receptacles. Each connector terminal unit may comprise a tab and a receptacle, or as illustrated, the terminal unit 6' of one connector may comprise the tabs 5' and the other terminal unit 6 comprises the receptacles 5. Preferably, the terminal unit 6' of the connector comprising male contacts protruding from the front face of the terminal unit, comprises the tabs 5', and the terminal unit 6 of the connector comprising female contacts comprises the receptacles 5. The male contacts thus receive additional protection by the tabs flanking the contacts.

One of the connectors has a casing 4' with a mating portion that forms a receptacle pluggably receiving therein the mating portion of the casing 4 of the other connector. In a preferred embodiment, the connector with the male contacts has the casing 4' defining a receptacle receiving therein the mating portion of the casing 4 of the connector with the female contacts.

In variants, it is however possible to have the terminal unit 6' of the second connector comprising female contacts, and the terminal unit 6 of the first connector comprising male contacts, or each terminal unit comprises both male and female contacts.

The angular positioning tabs 5' and mating angular positioning receptacles 5 are configured to allow sliding insertion during the plugging connection and to align the terminal units 6, 6' of the mating first and second connectors as they are plugged together. In particular, the mating angular positioning tabs and receptacles 5', 5 ensure that the exact angular position of the terminal units 6, 6' with respect to each other is ensured before the electrical contacts plug together.

Each of the first and second connectors preferably comprise a pair of angular positioning members as illustrated, each of the pair arranged on opposite sides of the terminal module housing.

The angular positioning members may advantageously be integrally formed with the terminal unit housing, which may advantageously be an injection molded component.

One or both of the terminal units 6, 6' in these configurations are provided with a slight angular play with respect to their respective casings 4, 4' in order to allow their alignment during mating.

In a preferred embodiment, only one of the terminal units 6 is provided with a slight angular play with respect to its casing 4, the other terminal unit 6' being fixed to its casing 4' without any angular play with respect to its casing 4'. This ensures that one of the connectors forms a fixed angular reference between casing and terminal unit to which the other adjusts.

The slight angular play is configured to allow an angular rotation in a range between 0.5° and 3° of the terminal unit with respect to the casing. Preferably the angular play between the terminal unit and the casing is in a range of 0.5° and 2°.

Furthermore, the terminal modules 10, 10' within the terminal housings 8, 8' are provided with a slight amount of play to allow each of the mating terminal modules to align with each other to reduce mating forces. One or both of the first and second connectors are provided with a slight amount of play in the fit between the terminal modules and the cavity in the terminal housing, in particular the fit between the guide rail 14 on the terminal module and the complementary guide member **14*a*** in the terminal housing, in a range of 0.05 mm to 0.2 mm to allow each of the mating terminal modules to align with each other to reduce mating forces.

Preferably, the play between each terminal module and the terminal housing, in particular the fit between the guide rail 14 on the terminal module and the complementary guide member **14*a*** in the terminal housing, may be in a range of 0.08 mm to 0.15 mm.

Therefore, notwithstanding the angular alignment that occurs between the casings of the respective first and second connectors due to angular alignment members 7, 7' provided on the casings, the internal terminal units 6, 6' are allowed to self align with respect to each other independently from at least one casing to adjust for the casing alignment, which further allows the terminal modules within the terminal unit housings 8, 8' to have a slight amount of play to adjust optimally during plugging for optimal electrical contact and low plugging insertion forces. The casing alignment members 7, 7' may comprise a protuberance 7 on one of the casings engaging in an axially extending groove in the other of the casings.

According to an embodiment, the casing 4 comprises a cable grip 50 that comprises a cable grip sleeve 51 mounted at a cable end of the inner shells 32. The cable grip 50 comprises a cable grip sleeve 51 and a cable grip tightening nut 57 engaging an outer threaded portion 56 of the cable grip sleeve 51 configured to cause an axial displacement of the cable grip sleeve. The cable grip tightening nut 57 abuts against an end of the inner shells 32. The cable grip sleeve 51 comprises a plurality of gripping arms 52 that are integrally formed from the cable grip sleeve 51 separated by slots 55 to allow each gripping arm 52 to be able to bend elastically independently from the other. In an advantageous embodiment there may for instance be two to six gripping arms 52 and corresponding number of slots 55, preferably four to six gripping arms and corresponding slots.

At a free-end of the gripping arms 52, one an inner surface thereof, are provided serrations 53 and on an outer peripheral surface of each gripping arm 52 is provided a cam head portion 54 that engages a cable grip camming surface 49 on an inner surface of the inner shells 32. As the cable grip tightening nut 57 is turned in a tightening direction, the cable grip sleeve 51 is pulled in an axial direction towards the cable exit such that the camming head portion 54 engages the conical camming surface 49 and presses the serrations 53 of the gripping arm radially inwards to grip the cable.

List of references used
- First Connector 2
  - Casing 4
    - Cable exit end 29
    - Plugging interface 30
      - Casing angular alignment member 7
    - Inner shells 32

-continued

- Cable grip camming surface 49
    - Outer shell 34, 36
      - Mating end ring shell 36
        - inner camming surfaces 15
      - Cable end ring shell 34
    - Cable grip 50
      - Cable grip sleeve 51
        - Gripping arm 52
          - Serrations 53
          - Cam head portion 54
        - Slots 55
        - Threaded portion 56
      - Cable grip tightening nut 57
  - Cable exit sleeve 28
  - Terminal unit 6
    - Plugging interface 31
    - Housing 8
      - Casing positioning/locking elements 39a, 39b
      - Module receiving cavity 37
        - Sidewall 46
        - Guide member 14a
      - Angular Positioning members 5
      - Elastic latch arms 13
        - Cam surfaces 17
      - Terminal module 10
- Mating Second Connector 2'
  - Casing 4'
    - Plugging interface 30'
      - Casing angular alignment member 7'
    - Panel front locking ring 34'
    - Panel rear locking ring 36'
  - Terminal unit 6'
    - Plugging interface 31'
      - Housing 8'
        - Module receiving cavity 37'
          - Sidewall 46'
          - Guide member 14a'
        - Angular Positioning members 5'
        - Latching shoulder 19'
        - Terminal module 10'
- plugging direction A
- terminal module height H
- terminal module width W

The invention claimed is:

1. Connector system comprising a first pluggable electrical connector comprising a substantially circular casing and a terminal unit mounted within the casing, the terminal unit comprising a housing with a module receiving cavity formed within the housing, and a plurality of terminal modules insertably received in the module receiving cavity in a stacked arrangement, each terminal module comprising a plurality of contacts, and a mating second connector pluggably connectable and disconnectable to the first connector, the mating second connector comprising a substantially circular casing and a terminal unit mounted within the casing, the terminal unit comprising a housing and a plurality of terminal modules mounted in a stacked arrangement in said housing, each terminal module comprising a plurality of contacts for pluggable connection to a corresponding said plurality of contacts of said first connector, the casings comprising angular alignment members configured to angularly align the casings of the respective first and second connectors with respect to each other, wherein the terminal unit housing of the first connector comprises angular positioning members mating with complementary angular positioning members on the terminal unit housing of the second connector, the angular positioning members and mating angular positioning members configured to allow sliding insertion during plugging connection and to align the terminal units of the mating first and second connectors as they are plugged together, wherein the terminal unit of at least one of the first and second connectors is provided with a slight angular play with respect to the casing allowing an angular rotation in a range between 0.5° and 3° of the terminal unit with respect to the casing.

2. Connector system according to claim 1, wherein the angular positioning members comprise receptacles and the complementary angular positioning members comprise tabs insertable in the receptacles.

3. Connector system according to claim 1, wherein each of the first and second connectors comprise a pair of angular positioning members, each of the pair arranged on opposite sides of the terminal module housing.

4. Connector system according to claim 1, wherein the angular positioning members are integrally formed with the terminal unit housing.

5. Connector system according to claim 1, wherein the angular play between the terminal unit and the casing is in a range of 0.5° and 2°.

6. Connector system according to claim 1, wherein the terminal unit of only one of the first and second connectors is provided with said slight angular play with respect to the casing and the terminal unit of the other of the first and second connectors is fixed to the casing without angular play.

7. Connector system according to claim 1, wherein each of the terminal modules within the terminal housing of at least one of the first and second connectors are provided with a slight amount of play in a range of 0.05 mm to 0.2 mm to allow each of the mating terminal modules to self align with each other to reduce mating forces.

8. Connector system according to claim 7, wherein the play between each terminal module and the terminal housing is in a range of 0.08 mm to 0.15 mm.

9. Connector system according to claim 1, wherein at least one terminal module within the terminal housing has a height H and at least a second terminal module has an integer multiple of said height H.

10. Connector system according to claim 1, wherein the casing of at least the first connector comprises a cable grip sleeve and a cable grip tightening nut engaging an outer threaded portion of the cable grip sleeve configured to cause an axial displacement of the cable grip sleeve, the cable grip sleeve comprising a plurality of integrally formed gripping arms with serrations at ends thereof, the gripping arms separated by slots to allow each gripping arm to be able to bend elastically independently from the other.

11. Connector system according to claim 10, wherein there are six gripping arms and corresponding slots.

12. Connector system according to claim 10, wherein the casing comprises a pair of inner shells mounted around a rear end of the terminal housing and the cable grip tightening nut abuts against an end of the inner shells.

13. Connector system according to claim 12, wherein an outer peripheral surface of each gripping arm is provided a cam head portion that engages a conical cable grip camming surface on an inner surface of the inner shells.

* * * * *